United States Patent
Tseng et al.

(10) Patent No.: US 9,201,948 B1
(45) Date of Patent: Dec. 1, 2015

(54) SYSTEMS AND METHODS FOR RECEIVING, AGGREGATING, AND EDITING SURVEY ANSWERS FROM MULTIPLE SOURCES

(71) Applicant: Internet Brands, Inc., El Segundo, CA (US)

(72) Inventors: Franklin Tseng, Hermosa Beach, CA (US); Armen Abrahamian, Los Angeles, CA (US); Wade Hewitt, Santa Monica, CA (US); Benjamin Meyer, Los Angeles, CA (US); James Watters, Pasadena, CA (US)

(73) Assignee: Internet Brands, Inc., El Segundo, CA (US)

(*) Notice: Subject to any disclaimer, the term of this patent is extended or adjusted under 35 U.S.C. 154(b) by 0 days.

(21) Appl. No.: 14/557,278

(22) Filed: Dec. 1, 2014

Related U.S. Application Data (60) Provisional application No. 61/991,270, filed on May 9, 2014.

(51) Int. Cl.
  *G06F 17/30* (2006.01)
  *G06Q 30/02* (2012.01)
  *G06F 21/62* (2013.01)
(52) U.S. Cl.
  CPC ...... *G06F 17/30598* (2013.01); *G06F 21/6218* (2013.01); *G06Q 30/0203* (2013.01)
(58) Field of Classification Search
  CPC ..................... G06F 17/30598; G06F 21/6218
  USPC ..................... 726/28; 709/203, 206
  See application file for complete search history.

(56) References Cited

U.S. PATENT DOCUMENTS

| | | | |
|---|---|---|---|
| 2008/0010351 A1* | 1/2008 | Wardhaugh et al. | 709/206 |
| 2012/0095796 A1* | 4/2012 | Gately et al. | 705/7.13 |
| 2012/0226743 A1* | 9/2012 | Smargon | 709/203 |
| 2012/0271884 A1* | 10/2012 | Holmes et al. | 709/204 |
| 2013/0282626 A1* | 10/2013 | White et al. | 706/11 |
| 2014/0280609 A1* | 9/2014 | Averbeck | 709/206 |

OTHER PUBLICATIONS

"Rent Wiki Verified Resident Integration Part 1," unpublished documentation for "VRP," compiled by employees of Internet Brands, Inc., Jun. 19, 2012 (see attached Explanation of Relevance).

\* cited by examiner

*Primary Examiner* — Haresh N Patel
(74) *Attorney, Agent, or Firm* — Rosenberg, Klein & Lee

(57) ABSTRACT

A software-implemented method may receive, organize, and aggregate survey answers from multiple survey sources into a single database, regardless of the initial method of collection. Survey answers may require certain common information fields. The survey answers may include media which is transferred from the survey source to the database, and the original copy at the survey source deleted upon a completed transfer. A survey participant may access his own answer, associate it with a user account using a passcode, and make edits to the answer; the source of a survey may also edit an answer by resubmitting the answer. Edited answers may be displayed along with the original version, for instance in a "threaded" display format.

19 Claims, 3 Drawing Sheets

FIG. 3

SYSTEMS AND METHODS FOR RECEIVING, AGGREGATING, AND EDITING SURVEY ANSWERS FROM MULTIPLE SOURCES

CROSS-REFERENCE TO RELATED APPLICATIONS

This application claims the benefit of U.S. Provisional Application No. 61/991,270, filed on May 9, 2014 in the US Patent and Trademark Office. All disclosures of said provisional application are incorporated herein by reference.

BACKGROUND OF THE INVENTION

1. Field of the Invention

The present invention relates to systems and methods for managing survey answers from multiple sources. In particular, although not exclusively, methods are described to receive answers to surveys conducted by multiple survey sources, in a format such that the survey answers may be aggregated notwithstanding their separate sources; additionally, survey participants may identify themselves after the fact, to edit their earlier answers and associate those answers with a user account.

2. Description of the Related Art

It is common practice to survey customers of a business and determine the quality of the business' goods and services, along with other opinions of the customers about the business. Survey results may be useful either to the reviewed businesses, who may use the information to find areas for improvement, or to the public, who may use the aggregated information to compare businesses and make informed decisions about which to frequent. Surveys may also be used to collect opinions on non-business subjects, such as the popularity of a pending legislative bill, which could influence the actions or words of political figures regarding that bill.

The introduction of the Internet has allowed for two common, and frequently related, improvements on surveys. First, survey answers may be collected online; that is, an online form may allow entry of answers which will be submitted to a database. The convenience of this system increases the likelihood that a surveyed customer will complete and submit the survey. Second, a database of all survey answers may be accessed online, with the data conveniently organized and arranged by preference of the accessing party. This is especially useful for public access purposes, as the public has come to expect the Internet to be the primary source for any information they could desire.

It may be desirable to combine the efforts of multiple third party survey sources, who may be able to collect survey answers from different groups of people in different circumstances depending on their respective resources. In some cases, it may also be permissible and desirable to use answers from a pre-existing survey. However, this can complicate aggregation of the survey answers, as different survey sources may have their own surveys with distinct questions. Computer automation normally complicates this issue rather than resolves it, as an automated system is generally not flexible enough to merge differing content. A system that can aggregate these surveys into a uniform set of data is therefore desirable.

Survey answers are frequently anonymous and, for convenience, might not require an identification process of any sort. For instance, a survey might be submitted online but without using a login process, or the initial survey answer might have been provided in paper or other analog form and converted to a digital form later. Additionally, when a survey answer is transferred from a third party survey source, identifying details such as a login may prove inconvenient, impractical, or even impossible to transfer with the answer. However, it may be desirable to edit a survey answer after submission, and it is important that only the participant who provided a given survey answer be able to edit that answer. A method for limiting editing control to that participant, even without an existing and associated login, is therefore desirable.

SUMMARY OF THE INVENTION

While not limited thereto, an embodiment of the present invention is directed to a method of receiving and organizing survey answers, the method including, from a first source, receiving an first survey answer; conducting one or more tests on the first survey answer to confirm it is an approved survey answer; if confirmed as an approved survey answer, storing at least part of the first survey answer to a first database; from a second source, receiving a second survey answer; conducting one or more tests on the second survey answer to confirm it is an approved survey answer; and if confirmed as an approved survey answer, storing at least part of the second survey answer to a second database, wherein, if a subject matter of the first survey answer and a subject matter of the second survey answer match, the first database and the second database are the same database.

According to an aspect of the invention, the one or more tests for each survey answer may include: a test to confirm the source of the survey answer is an authorized source, based on a unique source ID; a test to confirm the subject matter of the survey answer is a known subject matter, based on a unique subject matter ID; and a test to confirm the survey answer comprises a series of information fields matching a set of required information fields for the subject matter of the survey answer.

According to an aspect of the invention, the first survey answer may include an associated passcode, and the method may further include: after storing the first survey answer, receiving a request to edit the first survey answer; receiving an additional passcode; and if the additional passcode matches the associated passcode of the first survey answer, granting permission to edit the first survey answer, receiving an edited survey answer, and editing the first survey answer in the first database to reflect at least part of the edited survey answer.

According to an aspect of the invention, the method may further include, after storing the first survey answer, generating a passcode; associating the passcode with the first survey answer; after associating the passcode, receiving a request to edit the first survey answer; receiving an additional passcode; and if the additional passcode matches the associated passcode of the first survey answer, granting permission to edit the first survey answer, receiving an edited survey answer, and editing the first survey answer in the first database to reflect at least part of the edited survey answer.

According to an aspect of the invention, the method may further include, if the additional passcode matches the associated passcode of the first survey answer, associating the first survey answer with a user account.

According to an aspect of the invention, the method may further include receiving an additional survey answer from the first source; comparing one or more identifying features of the additional survey answer to one or more identifying features of the first survey answer; and if the one or more identifying features of the additional survey answer match the one or more identifying features of the first survey answer, editing the first survey answer in the first database to reflect at least part of the additional survey answer.

According to an aspect of the invention, the one or more identifying features of the first survey answer may include a first answer ID, and the one or more identifying features of the additional survey answer may include an additional answer ID.

According to an aspect of the invention, the one or more identifying features of the first survey answer may include a name, a physical address, a phone number, or an email address, and the one or more identifying features of the additional survey answer comprise a name, a physical address, a phone number, or an email address.

According to an aspect of the invention, the method may further include receiving an additional survey answer from the first source; checking the additional survey answer for a label indicating that the additional survey answer is a duplicate survey answer; and if the additional survey answer is a duplicate survey answer: comparing one or more identifying features of the additional survey answer to one or more identifying features of the first survey answer, and if the one or more identifying features of the additional survey answer match the one or more identifying features of the first survey answer, editing the first survey answer in the first database to reflect at least part of the additional survey answer.

According to an aspect of the invention, the editing of the content of the first survey answer may include inserting the at least part of the edited survey answer and a timestamp into the first survey answer.

According to an aspect of the invention, the method may further include, if the first survey answer comprises a media location address: retrieving media from the media location represented by the media location address, storing the media to a memory, and amending the media location address to represent the new location of the media in the memory.

According to an aspect of the invention, the method may further include, if the first survey answer comprises a media location address, after storing the media to the memory, instructing the first source to delete the media from the media location represented by the media location address.

According to an aspect of the invention, the method may further include, if the first survey answer comprises a media identifier: requesting a media having the media identifier from the first source, receiving the media having the media identifier from the first source, storing the media to a memory, and amending the media identifier to reflect that the media is located in the memory.

According to an aspect of the invention, the method may further include, if the first survey answer comprises a media identifier, after storing the media to the memory, instructing the first source to delete the media having the media identifier from a first source memory.

According to an aspect of the invention, any of the above methods may be encoded, on a non-transitory computer readable medium, as processing instructions to be implemented by one or more processors.

While not limited thereto, an embodiment of the present invention is directed to a system of receiving and organizing survey answers, including a computer readable memory, a database implemented on the computer readable memory, a transceiver in communication with the computer readable memory and further in communication with a network, and a processor in communication with the memory and configured to execute one or more of the above methods.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

The titles of each section of this description are for convenience only, and should not be interpreted as limiting the scope of the invention.

Use of the singular or plural in this description should not be interpreted to limit the scope of the invention to the singular or plural, except where the number or range is made explicit (e.g., "one element" or "a plurality of elements" would be explicit, whereas "an element" or "elements" would not be). Also, male and/or female pronouns may be used throughout this description for convenience, and should not be interpreted as limiting.

1. Glossary

Survey Answer: A collected series of answers to questions in a survey.

Survey Participant: A person provided with a survey, with the intent that they should provide a survey answer in response.

Approved Survey Answer: A survey answer which is from a known and approved source and which contains all required information for the subject matter of the survey answer.

Survey Aggregation: An aggregation of information collected from all received and approved survey answers for a given subject matter.

Rating Field: An information field that expresses a point on a scale which is or may be converted to a numerical value; for instance, from 0 to 10, or from 1 star to 5 stars.

ID: A code phrase or string of symbols, including alphanumeric symbols, assigned to an object or concept for the primary purpose of uniquely identifying the object or concept within a given set of objects or concepts. An ID may be incorporated into an address for the secondary purpose of locating the object or concept, as represented in digital or physical form, but may not be the entire address.

2. Submitting and Aggregating Survey Answers

One or more third party survey companies, or survey sources, communicate with a central database provider in order to aggregate survey answers of all said survey sources. For any given survey aggregation, the surveys of all the survey sources will be regarding the same subject matter, though that subject matter may vary wildly from survey aggregation to survey aggregation. Topics could include opinions on the goods and services of businesses in the same field (such as restaurants or apartment complexes), political polls (on the popularity of candidates, political parties or movements, or other subjects), or personal or household information (such as demographic data), among many others. Additionally, two separate subject matters could both be on the same topic (for instance, resident opinions of apartment complexes), yet be distinct subject matters due to contrasting questions within the surveys. A subject matter is therefore defined, for the purposes of this description, both by the topic and the questions of the surveys that fall under the subject matter.

For convenience, the remainder of this section of the description will assume in places that the surveys, and resulting survey aggregation, will be on the subject of apartment complexes and will be sent to residents or former residents of said complexes. However, this assumption should not be treated as limiting on the scope of the invention, and those of skill in the art will be able to extrapolate the described principles to cover a variety of other subject matters. It should be noted in particular that the same embodiment could be used to create multiple survey aggregations, each from a different subject matter, with only minor configuration changes between survey aggregations.

Figure 1:
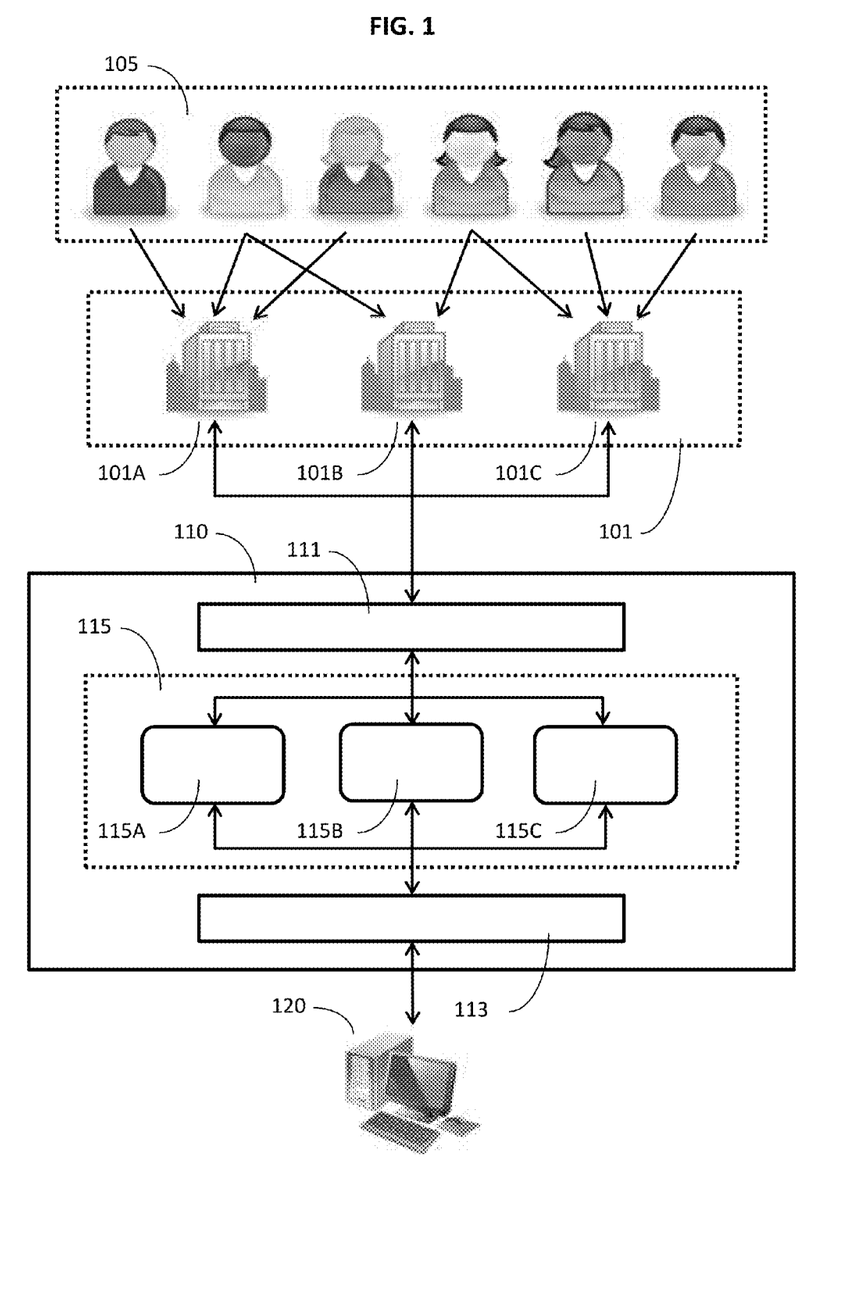
FIG. 1 is a diagram depicting the interactions of various survey participants and survey sources with a receiving software module and database, according to an embodiment of the invention.

FIG. 1 is a diagram depicting the interactions of various survey participants and survey sources with a receiving software module and database, according to an embodiment of the invention.

Each of a number of survey sources 101 supplies a survey to a plurality of survey participants 105—for instance, the residents of various apartment complexes—and collects survey answers in response. It is noted that although the number of survey sources 101 and survey participants 105 are depicted as three and six, respectively, this is only for reasons of space, and the invention is not limited to any number of either survey sources or survey participants. It is also noted that the arrows depicting interactions between survey sources and survey participants do not depict a required number or arrangement of interactions, but merely establish that each of the survey participants 105 supply information to at least one of the survey sources 101.

Each of the survey sources 101 may have their own methodologies for supplying and collecting these surveys, for instance by mail or through an online poll.

For convenience, when referring to only one rather than several survey sources, this description may refer to survey source 101A, although it will be recognized that the same principles will apply equally to other survey sources such as 101B and 101C.

Each of the survey sources 101 transmits the survey answers, either individually or in bulk, to be received and handled by a receiving software module 111, encoded on a memory in a central computer 110 and executed using one or more processors. The transmission may be performed through any method that may transmit data, including but not limited to the Internet, a local network, a direct cable, a Bluetooth transmission, a phone line, or a physically-carried data storage unit.

It is also possible, in some embodiments, that at least one survey source (not depicted) may store, process, and/or convert its survey answers using the resources of the central computer 110 on which the receiving software module 111 is encoded. For instance, the central database provider and one of the survey sources may be the same party. In such cases, it may be that no transmission from the at least one survey source to the receiving software module 111 is necessary.

One or more databases 115 are also located on the memory of the central computer 110, and are accessed by the receiving software module 111. (It is noted that although the number of databases 115 is depicted as three, this is only for reasons of space, and the invention is not limited to any number of databases.) The receiving software module 111 and databases 115 may alternatively be located on memories of different computers but remain in communication with each other; for convenience, however, they are depicted together in FIG. 1. Each database may be associated with a subject matter and may contain a survey aggregation on that subject matter.

For convenience, when referring to only one rather than several databases, this description may refer to database 115A, although it will be recognized that the same principles will apply equally to other databases such as 115B and 115C. The description will further assume, for convenience, that database 115A will be the database on which the aggregation of survey answers on the subject matter of apartment complexes is located, and that any survey answer being considered is on the same subject matter, though of course survey answers might have other subject matters, and furthermore, embodiments and configurations where no or multiple databases contain information on apartment complexes are possible.

A display software module 113 is also located on the memory of the central computer 110, or on an alternative memory, and is in communication with the databases 115. The display software module 113 may be a distinct program, as depicted in FIG. 1, or may be integrated with the receiving software module 111. Its operation will be detailed in a later portion of this description; for now it is sufficient to note that it may interact with a computer 120 with access to the Internet, or through some other form of client hardware.

Before transmitting the survey answer to the receiving software module 111, each survey source 101 may first convert the survey answers to a standardized digital form, either individually or in bulk. Generally, each survey source will be instructed in the requirements of the standardized digital form in advance. The methods for converting the answers to the standardized digital form will vary as is convenient given the individual methods of collection; for instance, a digitally collected survey answer may be automatically converted by software, while a survey answer received by mail might first be scanned using optical character recognition (OCR), optical mark recognition (OMR), or other methods, or perhaps entered into a computer by hand. A survey answer not in the standardized digital form will be rejected by the receiving software module 111 as invalid, in a process which will be described further below.

In some embodiments, the standardized digital form may be coded in XML or another structured format.

A survey answer converted to the standardized digital form should include certain required information fields. These required information fields may vary depending on the specific subject matter of the survey, and on other configuration settings, but serve in all cases to ensure that all survey answers in a given survey aggregation provide comparable answers. In most cases, the survey source 101A will include questions in each survey such that each survey answer will include data for all required information fields before it is converted, but in some cases the survey source 101A may fill some of the required information fields during the conversion process.

In some embodiments, a required or optional information field may contain a value on a scale; that is, the information field is a rating field. For instance, a rating field may contain a response to a question such as "how strongly do you agree with the following statement?" or "how do you rate the apartment complex in safety?" A rating field's scale may be defined as, for example, from "0" to "10", from "F" to "A", or from "strongly disagree" to "strongly agree"; other scales may also be possible. An average of the values, or numerical equivalents thereof, may be calculated and included as part of a display of the survey aggregation.

In a subset of the embodiments with rating fields, multiple defined scales may be allowed for the same rating field, each having a standardized equivalent. As but one example, "0" to "10" and "1 star" to "5 stars" could both be permissible scales, where "1 star" could be defined as equivalent to "0", "2 stars" as equivalent to "2", "3 stars" as equivalent to "5", "4 stars" as equivalent to "8", and "5 stars" as equivalent to "10". This approach will allow for calculation of an average in the survey aggregation even in cases where two survey sources use different scales for the same rating field. These embodiments may also, when displaying individual survey answers (see S301 in FIG. 3, described below), select one scale for a rating field and, for survey answers that used another scale, display the standardized equivalent of the instead of the original scale, creating consistency between answers.

A survey answer converted to the standardized digital form might also contain optional information fields. Whereas a survey answer without all required information fields present will be rejected by the receiving software module 111 as invalid, a survey answer without all, or any, optional information fields present will be approved and stored in the database 115A, with these fields left blank or with null values. If an optional information field is a rating field, the calculated average for that field in the survey aggregation may ignore those survey answers that do not include the field.

As but one example, a survey given to residents of apartment complexes might include the following required information fields: an identifier for the apartment complex, a move-in date for the resident, a recommendation field (which can be set to Yes, No, or Neutral), and rating fields such as Neighborhood, Grounds, Staff, Maintenance, Safety, Noise, and Overall. An optional information field of a move-out date for the resident may also be present in this example.

In many embodiments and configurations, a Comment will be among the optional information fields.

In some embodiments, data from the survey answer which does not fit into any of the other required information fields may be placed in an optional Miscellaneous field, or appended to the content of the Comment field. In other embodiments, the receiving software module will ignore some or all data from the survey answer that is not within a required or optional information field. In still other embodiments, data from the survey answer that is not within a required or optional information field will trigger a rejection.

In some embodiments, each of the survey sources 101 may have a source ID which should be assigned for a given survey source 101A no later than the first time the survey source 101A transmits a first survey answer, and which should be unique among all survey sources 101. The source ID may take a numeric, alphabetic, or alphanumeric form, and may also contain symbols. In such embodiments, the source ID may have a corresponding required information field. When a survey source 101A converts the survey answers to the correct standardized digital form, it will include its own source ID in each survey answer.

In some embodiments, the receiving software module 111 may be configured to receive survey answers on multiple subject matters, and create a different survey aggregation for each such subject matter. In such embodiments, each survey subject matter may have its own subject matter ID which should be assigned when the survey aggregation for said subject matter is configured, and which should be unique among all subject matters. In such embodiments, the subject matter ID may have a corresponding required information field. When a survey source 101A converts the survey answers to the correct standardized digital form, it will include the correct subject matter ID in each survey answer. The receiving software module 111 will check this subject matter ID on receipt, and will sort the survey answer into the correct survey aggregation accordingly. Furthermore, in such embodiments, other required information fields may vary from subject matter to subject matter.

In some embodiments, one required information field may be an email address of the party who answered the survey. Possible uses of this email address will be described further herein.

Figure 2:
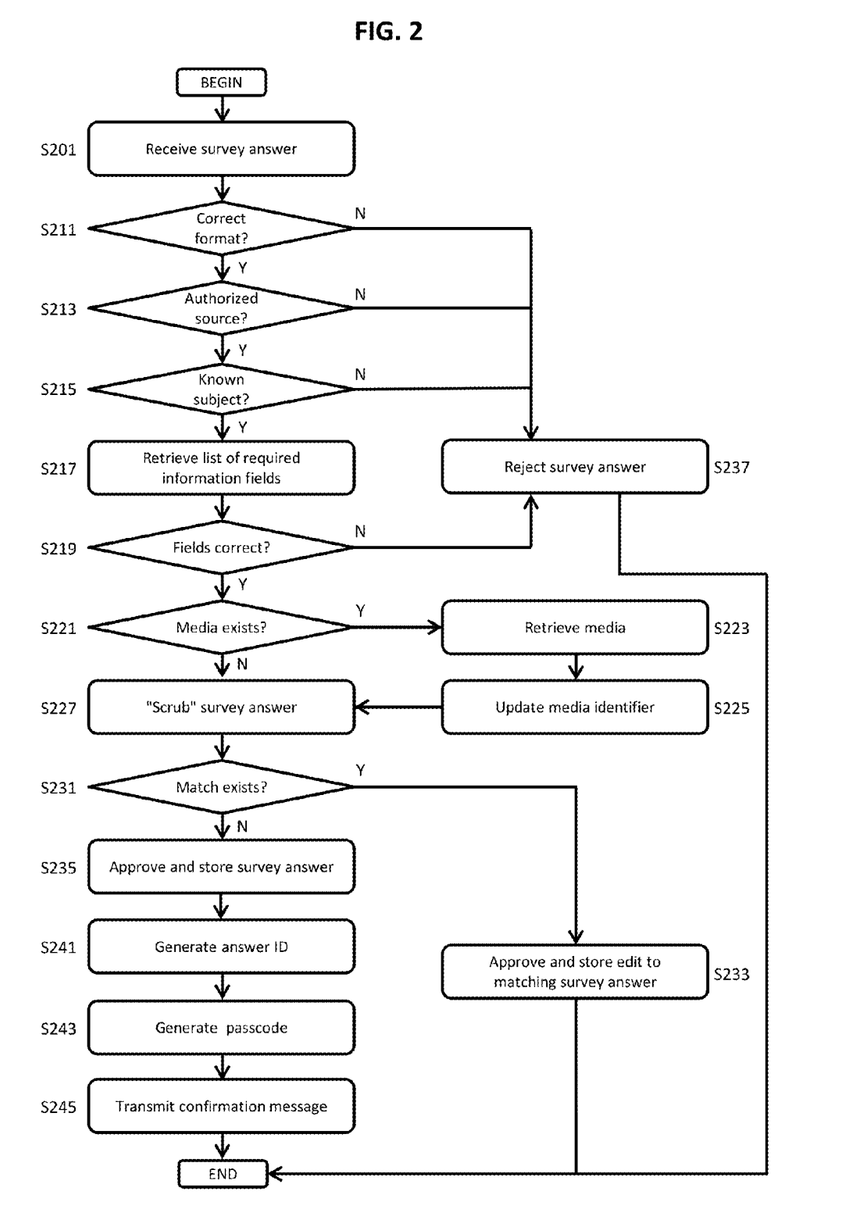
FIG. 2 is a flowchart depicting a method of receiving a survey answer, approving it, and aggregating it in a central database, according to an embodiment of the invention.

FIG. 2 is a flowchart depicting a method of receiving a survey answer, approving it, and aggregating it in a central database with other survey answers, according to an embodiment of the invention.

At S201, a survey answer is received by the receiving software module 111. The survey answer may have been transmitted in any number of ways; as one example, if a survey source 101A collects the survey answers through a website, each survey answer may be converted to the correct standardized digital form and transmitted in an automatic fashion, using, for instance, an application programming interface embedded on the website.

The receiving software module 111 checks this survey answer to confirm that it is in the correct standardized digital form. First, at S211, it is confirmed that the general formatting is correct—i.e. there are no errors that make it unreadable, such as unclosed XML tags or data corruption. In embodiments which include a source ID required information field, the source ID may be checked against a list of authorized source IDs at S213 as a security measure. In embodiments where multiple databases 115 exist, each storing a different survey aggregation with different required information fields, the subject matter ID of the survey answer may be checked at S215 and, if a known subject matter ID, a complete list of required information fields for that subject matter may be retrieved at S217. The complete list may be stored for retrieval in the database 115A for the subject matter. The complete list of required information fields will then be compared to the survey answer at S219, confirming that each field is present and contains a value. In some embodiments, the receiving software module 111 may also confirm, at S219, that each value in each information field is valid for the field—for instance, that a rating field contains a value within a defined scale for that rating field, that an "email" information field contains a valid email address, or that a "date" information field contains a value that could be understood as a date. If any of these checks fail, the survey answer is rejected at S237; the receiving software module 111 may also return an error message in some embodiments.

If all validity checks S211, S213, S215, and S219 succeed, in some embodiments, the survey answer may be "scrubbed" at S227; that is, it may be automatically edited for display. Specifically, data that exceeds a desired length for a field may be truncated. Additionally, the scrubbing process may identify profanity or other undesired language and censor it, by replacing it with asterisks, dashes, or other censor symbols. Other automatic editing might also occur in some embodiments at this stage.

In some embodiments, before the survey answer is scrubbed, it is first temporarily stored in the memory of the central computer 110, as a backup procedure should an automatic edit prove undesired. Alternatively, the survey answer may be permanently stored into the database 115A as in S235 (described further below) before S227 occurs, and the results of S227 may be treated as an edit to the survey answer (see FIG. 3, described further below).

At this point, the survey answer is approved, and may be stored into the database 115A, at S235. If an embodiment with multiple databases 115, the receiving software module 111 may check the subject matter ID of the survey answer to determine which of the databases should store the survey answer.

In embodiments where the required information fields include a field that identifies the survey participant in some manner—for instance, a name, a physical address, a phone number, or an email address—the receiving software module 111 may compare the value for this field, alongside the source ID and/or the subject matter ID if provided, to the values for previously provided and stored survey answers in the database 115A, at S231. If a match is found in the database 115A at S231, the survey answer is stored as an edit for the match at S233, rather than an original and separate survey answer as would be done at S235. This process will be elaborated on further below.

In some embodiments, survey answers may optionally include media, such as images, video, or documents. When a survey participant provides media as part of the survey answer, this media may be initially placed in a storage memory (not depicted) under the control of a survey source 101A. This storage memory is accessible through the same network or other transmission method that is used to transmit the survey answer. Additionally, the optional information fields include a field which provides an identifier or identifiers of any such media in the media storage memory of the survey source 101A. These identifiers may take the form of storage addresses, or of media IDs which are generated and supplied by the survey source 101A and which are unique among stored media on the media storage memory of the survey source 101A.

In such embodiments, at S221, the media identifier field is checked, and if the field is present and not empty, the receiving software module 111 locates the media. If the identifier takes the form of a storage address, the receiving software module 111 checks the address provided for the media. If the identifier takes the form of a media ID, the receiving software module 111 signals the survey source 101A with the media ID, and the survey source supplies the media. Once the media is located, it is copied to the memory of the central computer 110 at S223, and the media identifier in the survey answer field is updated to reflect the media's copying to the memory of the central computer 110 at S225; for instance, if the identifier takes the form of a storage address, the address is updated to the media's new address in the memory of the central computer 110, while if the identifier takes the form of a media ID, a portion of the media ID may be altered in a manner that indicates the media is located on the memory of the central computer 110 rather than on the storage memory of the survey source 101A. In a subset of such embodiments, the media may be scrubbed along with the rest of the survey answer content at S227; for instance, media of excessive size may be compressed, or the media may be scanned for copyright-infringing material.

In a subset of such embodiments, at S223, the media storage memory of the survey source 101A may also be given authorization to delete the copy of the media still located on said media storage memory, or alternatively the receiving software module 111 may simply delete said copy itself if authorized. Either method will assist in recovering space on the media storage memory of the survey source 101A once it is understood that the media is safely copied to the memory of the central computer 110.

In some embodiments, when the receiving software module 111 stores the survey answer at S235, it generates an answer ID associated with the survey answer at S241. This answer ID should be unique at least among all answer IDs for the survey subject matter (that is, for all survey answers to be stored on database 115A), and may be unique among all answer IDs throughout all databases 115. The answer ID may serve the purpose of a unique identifier which may locate the survey answer in all databases 115, or in the database 115A containing the correct survey aggregation.

In some embodiments, a passcode associated with the survey answer may also be generated at S243. This passcode may in some embodiments be unique at least among all passcodes for the survey subject matter (that is, for all survey answers to be stored on database 115A), and may further be unique among all passcodes throughout all databases 115; however, in other embodiments neither is a requirement, so long as there are sufficient permutations of passcodes such that a person could not guess a passcode at random. The purpose for this passcode will be elaborated upon later.

In embodiments where the required information fields include a survey participant's email address, a confirmation message stating that the survey answer has been received and processed may at this point be transmitted to the survey participant's email address, at S245. Similarly, in embodiments where the required information fields include a survey participant's phone number, the confirmation message may be transmitted by text message to the survey participant's phone number. In yet other embodiments, the confirmation message may be transmitted to the survey source 101A, which will be tasked with forwarding it to the survey participant in a manner of its choosing. This confirmation message may include the answer ID, or another method of locating the survey answer in the survey aggregation such as a URL. The confirmation message may also include the passcode if one is generated.

Although not depicted in FIG. 2, in some embodiments a confirmation message may also be transmitted after a successful edit to an existing survey answer occurs at S233. In such embodiments, the confirmation message may include the answer ID of the existing (that is, the edited) survey answer, or another method of locating the survey answer in the survey aggregation such as a URL or other address. The confirmation message may also note that a survey answer was edited rather than created. In a subset of these embodiments, the passcode for the existing survey answer may also be included, although this may be deemed undesirable for security reasons.

It is noted that the order of operations depicted in FIG. 2 may be altered without departing from the scope of the invention. For instance, the order of the validity checks S211, S213, S215/S217, and S219 might be rearranged without harming the overall operation of the method. As another example, the match comparison S231 might occur before the scrubbing S227, and the media upload processes S221, S223, S225 might occur after the scrubbing S227. As yet another example, the answer ID and passcode generation S241 and S243 might occur at any point in the process, especially any point after S219, once it is confirmed that the survey answer will be stored instead of rejected.

While S241, S243, and S245 may be performed by the receiving software module 111, in some embodiments they may be performed by software (not depicted in FIG. 1) under the control of the survey source 101A, and will occur sometime before or during the conversion of the survey answer to the correct standardized digital form; both the answer ID and passcode will then be transmitted along with the survey answer and received at S201. This approach can provide a more immediate feedback to the survey participant, as the confirmation S245 may be provided almost immediately after the survey participant completes the survey, rather than at the end of the answer storage process depicted in FIG. 2. The confirmation S245 may also be provided via the survey source's software on a page, screen, popup, or other direct display mechanism, instead of via email or text message, removing the need for the survey participant to provide an email address or phone number, and thus allowing for true anonymity at every level. However, because an individual survey source 101A may otherwise be unable to generate an answer ID that will be unique among all survey sources 101, in such embodiments some portion of the answer may be derived from the source ID for the survey source 101A, ensuring that a different survey source will not generate a duplicate answer ID. As a simple example, the source ID might begin or end the answer ID. In embodiments where a unique or sufficiently unique passcode is also required, use of the source ID may be used in the same fashion to generate the passcode.

3. Viewing and Editing Survey Answers

Figure 3:
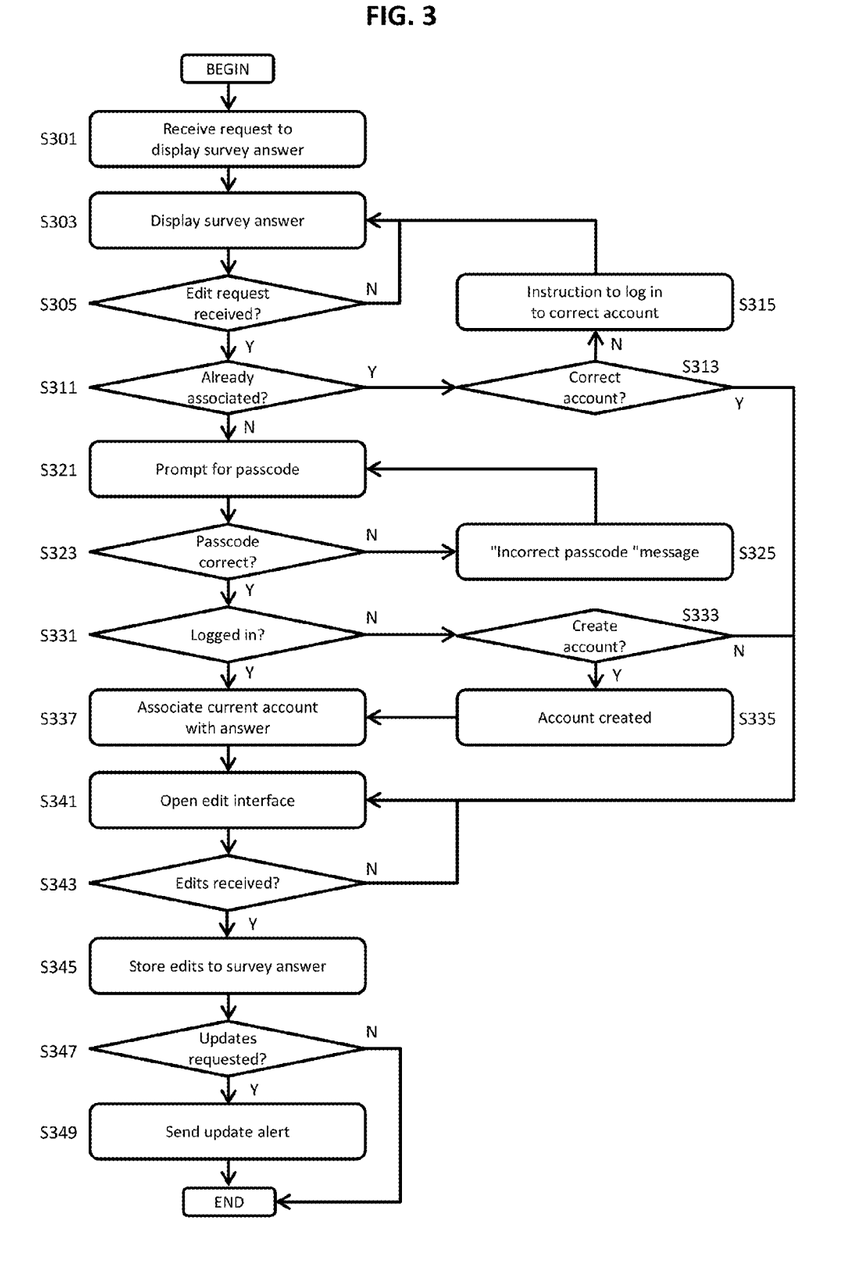
FIG. 3 is a flowchart depicting a method of displaying a survey answer, associating it with an account, and processing edits to it, according to an embodiment of the invention.

FIG. 3 is a flowchart depicting a method of displaying a survey answer, associating it with an account, and processing edits to it, according to an embodiment of the invention.

The content of a survey answer is accessible from the databases 115 through the display software module 113, using a computer 120 with access to the Internet, or through some other form of client hardware. A survey answer might be located and accessed in the databases 115 through numerous methods, which might include searching for one or more known elements in the survey answer, searching for the answer ID when known, or using a known address such as a URL; other methods might also be conceived of by those of skill in the art.

The display software module 113 receives a request for a survey answer at S301, and displays the survey answer at S303 after locating it in the databases 115. The displayed survey answer will include the formatted and scrubbed survey answer content, including access to any submitted media. It will also present an option to edit the survey answer, such as a clickable button, which is selected at S305.

As described and depicted earlier, in FIG. 2, in some embodiments, when a survey participant submits a survey answer, an associated passcode is generated at S243 and supplied to the survey participant at S245. When a user selects the option to edit the survey answer at S305, the display software module 113 requests the associated passcode at S321. If a passcode is provided, it is checked against the passcode that is associated with the survey answer at S323. If the provided passcode and the associated passcode match, the user is permitted to edit the survey answer content at S341. If the provided passcode and the associated passcode do not match, the user will be told so at S325. In some embodiments, the user may then be allowed to try providing another passcode, at S321, an indefinite number of times, while in others, the user will only be allowed to try a certain number of times, such as one or three, before the survey answer is locked from further attempts for a certain period, such as 30 minutes or one day (lockdown operation not depicted in FIG. 3).

In some embodiments, user accounts may exist which may be associated with survey answers. A user may log in to an account to identify himself and more easily access material associated with the account, such as the survey answers. In such embodiments, when a user tries to edit a survey answer at S305, the display software module 113 may check whether an account is already associated with the survey answer at S311 and, if so, whether the user is logged into that account at S313. If the user is logged in to an account which is associated with the survey answer—for instance, if the same account was used when the survey answer was initially submitted—the user is immediately permitted to edit the survey answer content at S341. If an account is already associated with the survey answer, but the user attempting to edit the survey answer is not logged in to this account, the user will not be asked for a passcode, but will be instructed to log in to the correct account at S315, and will not be permitted to edit the survey answer while he is not logged in to that account.

In some embodiments, after the correct passcode is confirmed at S323, the display software module 113 checks whether the user is logged into an account at S331. If the user is logged in to an account, but the account is not yet associated with the survey answer (as determined either in this operation or previously at S311), providing the correct passcode may associate the account with the survey answer at S337. This may occur automatically, or the user may be given an option whether to associate the account with the survey answer.

In some embodiments, if the user is not logged in to an account at all, as determined either at S331 or previously at S311, providing the passcode may also present the user with an option to create an account at S333. If the user agrees and creates the account at S335, the account will then be associated with the survey answer at S337, optionally or automatically.

In this manner, a submitter of a previously anonymous survey answer may have an account properly associated with the survey answer at any point after the survey answer has been submitted.

In some embodiments, the option to associate an account and a survey answer may be provided separately from the editing process—for instance, a separate button purely for associating an account with a survey answer may be provided at S303 if the survey answer is unassociated—or both options of "with editing" and "without editing" may be provided. A separated association process may resemble the process depicted in FIG. 3 from S321 to S337, or some subset thereof, but will not proceed to S341. A separated approach may be more intuitive to users who wish to associate an account with multiple survey answers promptly after creating that account, without desire to edit the survey answers, while a combined approach may be more streamlined when the user wishes to edit a survey answer immediately.

Once the correct passcode is provided at S323 or the user is otherwise identified at S313, an edit interface is provided at S341. In some embodiments, this edit interface may be part of the receiving software module 111, and for the remainder of the description this will be assumed for convenience, although in other embodiments the edit interface might instead be part of the display software module 113, or operated by some integration of the two modules. Numerous processes and interfaces for editing digital content are already well known in the field and will not be detailed here.

Once the desired edited content is submitted at S343, the edited survey answer is stored to the database 115A at S345.

In some embodiments, when a survey answer is edited, the prior survey answer content (i.e. the survey answer content as it existed before the edit) may not be preserved in the database 115A, but may be replaced by the edited survey answer content. Alternatively, the prior survey answer content may be preserved for a short period, such as an hour or a day, to allow for reversions in case of error or malicious behavior, but will be erased from storage after that period. Both approaches conserve data storage. In a subset of these embodiments, the survey answer content in the database 115A will include a notation that the survey answer has been edited, with or without the date of this editing; this notation may be displayed when the survey answer is displayed.

However, in other embodiments, the prior survey answer content is preserved for an extended period, such as a month or longer, or even indefinitely. In a subset of these embodiments, the edited survey answer content may be "threaded" with the prior survey answer content. That is, when viewing the survey answer at S303, the edited survey answer content may be displayed first, but then followed by the prior survey answer content, which is marked as the state of the survey answer before an edit (or as a "prior version" of the survey answer). The entire prior survey answer content may be displayed alongside the edited survey answer content, or the display software module 113 may simply provide a link to the prior survey answer content. A timestamp of the edit may also be stored with the survey answer and displayed. If a survey answer has been edited multiple times, each such version of the survey answer may be displayed in this manner, in order from newest to oldest.

In some embodiments, a survey source 101A may be able to request updates when a survey answer supplied through that survey source is successfully edited. In such cases, the survey source 101A may be able to turn on and off this feature, for some or all survey answers or subject matters supplied through that survey source. When a survey answer is edited, either the receiving software module 111 or the display software module 113 will check whether any survey source 101A has requested updates for that survey answer, at S347. If so, the survey source 101A is sent an update alert at S349, through one or more of several possible automated methods, such as email, text, or automated phone call. This update alert may contain an identifier for the survey answer, such as its ID or a link, or it may contain the edited content, with or without the original content for comparison; both options together are also possible, along with other possible information.

Returning to FIG. 2, in some embodiments, it may be possible to edit a survey answer through the survey source 101A. This is particularly useful when a survey source has a practice of following up with the same survey recipients for updates to their opinions. For instance, a survey source may survey residents of an apartment complex regarding that complex annually, or seek people's opinions of a political figure both before and after a political event such as a debate or the passage of a legislative bill.

The survey source 101A may request and collect edits to the survey answer however desired; frequently, using the same methodologies used to request and collect the initial survey answers. The survey source 101A may also submit the edited survey answers in the same manner and format as with the original survey answers; however, the edited survey answers should in many embodiments be labeled as an "edit" (or "duplicate"), using an optional information field designed for this label. In some embodiments, an edited survey answer must also include the answer ID of the original survey answer, or the URL or passcode associated with the survey answer. In other embodiments, the receiving software module 111, upon receiving a survey answer labeled as an "edit", will compare identifying details in the edited survey answer with existing survey answers from the same survey source until it finds a probable match, as shown in S231. The receiving software module 111 may seek confirmation that the correct existing survey answer has been located before storing the edit at S233.

4. Other Embodiments and Applications

The methods disclosed herein, and other processing instructions necessary to implement the system described herein, may all be encoded on a non-transitory computer readable medium, with the instructions to be executed using one or more processors.

A processor or processors may be configured to execute the methods and other processing instructions described herein. The processor or processors may be in communication with a non-transitory computer readable memory storing the instructions; the memory may also store software or data implementing other features of the database, software and/or websites.

In combination with other technologies, the present invention may be used to aggregate survey answers that were not deliberately supplied to the central database provider. For instance, in combination with a "scraper" system—that is, software that automatically reads and processes information from open third-party websites and databases—operation S201 may be implemented to have, or supplemented with software having, the ability to receive survey answers collected from an independent website. Other algorithms might then be required to convert these answers to the standardized digital form, although a sufficiently short list of required information fields will make this process simpler, and increase the likelihood that the survey answers of any given independent source will be approved.

Although a few embodiments of the present invention have been shown and described, it would be appreciated by those skilled in the art that changes may be made in this embodiment without departing from the principles and spirit of the invention, the scope of which is defined in the claims and their equivalents. In particular, functionally equivalent elements may be substituted for those specifically shown and described, order or placement of elements may be altered in certain cases, certain features may be used independently of other features, and all or some of the above embodiments may be selectively combined with each other.

What is claimed is:

1. A method of receiving and organizing survey answers from a plurality of survey suppliers using one or more hardware processors, the method comprising:

receiving a first survey answer from a first survey supplier, the first survey supplier having received said first survey answer from a first survey participant in response to a first set of survey questions supplied by the first survey supplier, the first survey answer associated with a survey subject matter;

determining, by the one or more hardware processors, whether the first survey answer is an approved survey answer;

if and only if the first survey answer is determined to be an approved survey answer, storing at least part of the first survey answer is survey answer database;

receiving a second survey answer from a second survey supplier different from the first survey supplier, the second survey supplier having received said second survey answer from a second survey participant in response to a second set of survey questions different from the first set of survey questions and supplied by the second survey supplier, the second survey answer associated with the same survey subject matter as the first survey answer;

determining, by the one or more hardware processors, whether the second survey answer is an approved survey answer; and if and only if the second survey answer is determined to be an approved survey answer, storing at least part of the second survey answer to the survey answer database;

wherein the operations of determining whether each survey answer is an approved survey answer each comprise:

determining whether the survey supplier of the survey answer is an authorized source, based on a source ID of the survey answer, the source ID unique to the survey supplier;

determining whether the subject matter associated with the survey answer is a known subject matter, based on a subject matter ID of the survey answer, the subject matter ID unique to the subject matter;

determining whether the survey answer comprises a series of information fields matching a set of required information fields for the subject matter of the survey answer; and if and only if all three of the above determinations are positive, determining that the survey answer is an approved survey answer.

2. The method of claim 1, wherein the first survey answer comprises an associated passcode, further comprising:

after storing the first survey answer, receiving a request to edit the first survey answer;

receiving an additional passcode; and if the additional passcode matches the associated passcode of the first survey answer,
  granting permission to edit the first survey answer,
  receiving an edited survey answer, and
  editing the first survey answer in the survey answer database to reflect at least part of the edited survey answer.

3. The method of claim 2, wherein the editing of the content of the first survey answer comprises inserting the at least part of the edited survey answer and a timestamp into the first survey answer.

4. The method of claim 2, further comprising, if the additional passcode matches the associated passcode of the first survey answer, associating the first survey answer with a user account.

5. The method of claim 1, further comprising:

after storing the first survey answer, generating a passcode;

associating the passcode with the first survey answer;

after associating the passcode, receiving a request to edit the first survey answer;

receiving an additional passcode; and if the additional passcode matches the associated passcode of the first survey answer,
  granting permission to edit the first survey answer,
  receiving an edited survey answer, and
  editing the first survey answer in the survey answer database to reflect at least part of the edited survey answer.

6. The method of claim 5, wherein the step of editing content of the first survey answer comprises inserting the at least part of the edited survey answer and a timestamp into the first survey answer.

7. The method of claim 5, further comprising, if the additional passcode matches the associated passcode of the first survey answer, associating the first survey answer with a user account.

8. The method of claim 1, further comprising:

from the first survey supplier, receiving an additional survey answer;

comparing one or more identifying features of the additional survey answer to one or more identifying features of the first survey answer; and if the one or more identifying features of the additional survey answer match the one or more identifying features of the first survey answer, editing the first survey answer in the survey answer database to reflect at least part of the additional survey answer.

9. The method of claim 8, wherein the step of editing content of the first survey answer comprises inserting the at least part of the edited survey answer and a timestamp into the first survey answer.

10. The method of claim 8, wherein:

the one or more identifying features of the first survey answer comprise a first answer ID, and the one or more identifying features of the additional survey answer comprise an additional answer ID.

11. The method of claim 8, wherein:

the one or more identifying features of the first survey answer comprise a name, a physical address, a phone number, or an email address, and the one or more identifying features of the additional survey answer comprise a name, a physical address, a phone number, or an email address.

12. The method of claim 1, further comprising:

from the first survey supplier, receiving an additional survey answer;

checking the additional survey answer for a label indicating that the additional survey answer is a duplicate survey answer; and if the additional survey answer is a duplicate survey answer:
  comparing one or more identifying features of the additional survey answer to one or more identifying features of the first survey answer, and
  if the one or more identifying features of the additional survey answer match the one or more identifying features of the first survey answer, editing the first survey answer in the survey answer database to reflect at least part of the additional survey answer.

13. The method of claim 1, further comprising, if the first survey answer comprises a media location address:

retrieving media from the media location represented by the media location address, storing the media to a memory, and amending the media location address to represent the new location of the media in the memory.

14. The method of claim 13, further comprising, if the first survey answer comprises a media location address, after storing the media to the memory, instructing the first survey supplier to delete the media from the media location represented by the media location address.

15. The method of claim 1, further comprising, if the first survey answer comprises a media identifier:

requesting a media having the media identifier from the first survey supplier, receiving the media having the media identifier from the first survey supplier, storing the media to a memory, and amending the media identifier to reflect that the media is located in the memory.

16. The method of claim 15, further comprising, if the first survey answer comprises a media identifier, after storing the media to the memory, instructing the first survey supplier to delete the media having the media identifier from a first survey supplier memory.

17. A system of receiving and organizing survey answers, the system comprising:

a computer readable memory;

one or more databases implemented on the computer readable memory;

a transceiver in communication with the memory and further in communication with a network; and one or more processors in communication with the memory and configured to execute the method of claim 1.

18. A non-transitory computer readable medium encoded with processing instructions for implementing the method of claim 1 using one or more processors.

19. The method of claim 1, wherein the survey answer database is a first subject matter database, further comprising:
receiving a third survey answer from the first survey supplier, the first survey supplier having received said third survey answer from a third survey participant, the third survey answer associated with a second subject matter different from the subject matter of the first survey answer;
determining, by the one or more hardware processors, whether the third survey answer is an approved survey answer; and
if and only if the third survey answer is determined to be an approved survey answer, storing at least part of the third survey answer to a second subject matter database different from the first subject matter database.

\* \* \* \* \*